W. W. Van Loan.
Paddle Wheel.
Nº 2,022.  Patented Mar. 29, 1841.
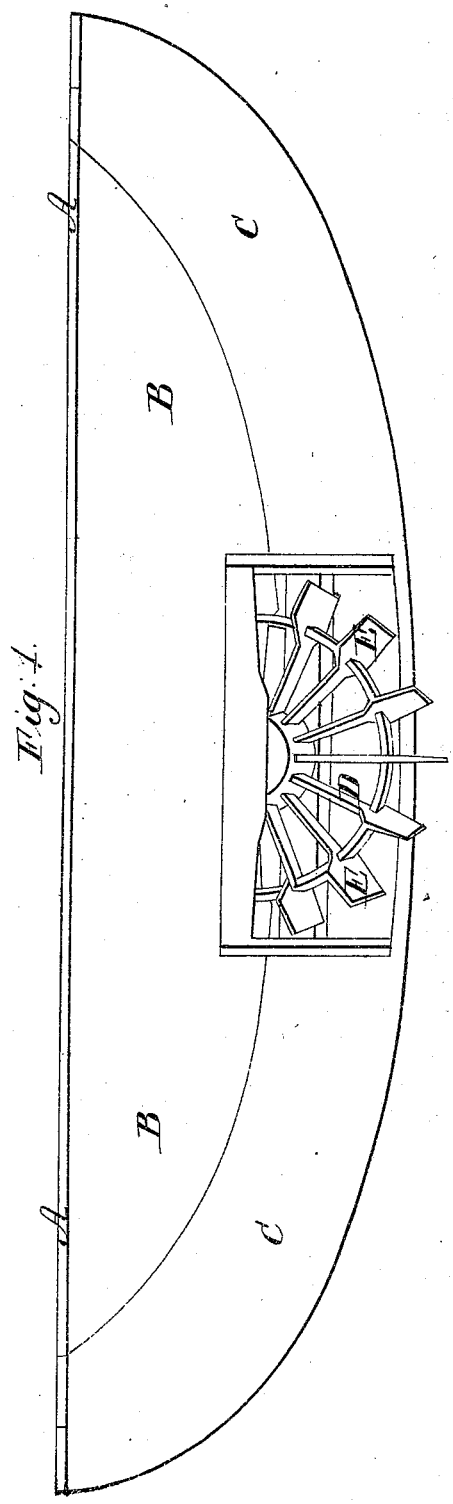
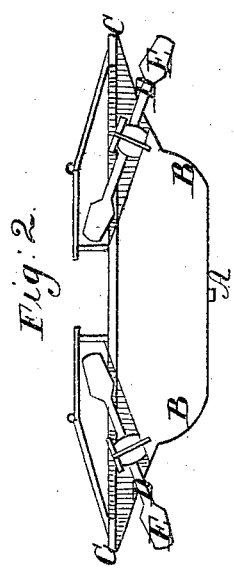

UNITED STATES PATENT OFFICE.

WILLIAM W. VAN LOAN, OF CATSKILL, NEW YORK.

IMPROVEMENT IN THE MANNER OF CONSTRUCTING AND ARRANGING PADDLE-WHEELS FOR PROPELLING VESSELS.

Specification forming part of Letters Patent No. 2,022, dated March 29, 1841.

*To all whom it may concern:*

Be it known that I, WILLIAM W. VAN LOAN, of Catskill, in the county of Greene and State of New York, have invented a new and Improved Mode of Arranging the Propelling-Wheels of Boats and of other Vessels Navigated by Steam or by other Motive Power; and I do hereby declare that the following is a full and exact description thereof.

My improvement consists in the manner in which I arrange the paddle- or propelling wheels, which, as ordinarily constructed, revolve in a vertical plane having their axes horizontal; but in my improved mode of construction and arrangement I so place the paddle or propelling wheels as that their axes shall form an acute angle with a vertical line—say of from fifteen to thirty degrees, more or less—and their planes of course form a like angle with the horizon. In constructing these I make the paddles long in the direction of their radii, and of such width from side to side as shall assimilate them to wide oars or sculls, adapting them in this particular to the size of the vessel to be propelled and the position in which they are to be placed. The object of this construction and arrangement is to cause the paddles to enter the water and to leave it in a direction resembling that in which oars enter and leave it in the ordinary operation of rowing. The revolving paddles or oars used by me are not feathered, as the oar is when operated by hand, they being permanently fixed on the wheels; but it will be manifest that they will first strike the water by their angular points or the projecting corners of their lower sides, and will gradually become immersed, and that they will leave it in the same way. From the manner of their entering and leaving the water, that continuous vibration or tremor to which vessels having the ordinary paddle-wheels are subjected will be nearly, if not entirely, prevented, said tremulous motion being produced, mainly, by the striking of the edges of the buckets on the water and by their lifting the water as they emerge therefrom.

In Figure 1 in the accompanying drawings I have shown a part of the lower side of a boat with one of my oblique propelling-paddle or rotary oar wheels.

A A, Fig. 1, is the keel; B B, a part of the hull; and C C the guard, which is here shown as forming an extended platform. D is one of the propelling-wheels furnished with rotary oars or paddles E E.

Fig. 2 is a cross-section through the wheels, the respective parts being similarly designated.

These wheels are to be moved by means of cranks or in any of the known ways in which propelling-wheels are made to revolve, the only novelty in my invention being the position in which I place said wheels and cause the paddles to operate.

What I claim, therefore, as constituting my improvement, and desire to secure by Letters Patent, is—

The placing of the said wheels in the position herein fully made known and represented, so that they shall enter and leave the water in a direction similar to that of oars in the ordinary process of rowing, the whole operating substantially in the manner described.

WM. W. VAN LOAN.

Witnesses:
IRA DUBOIS,
JOHN A. COOKE.